(12) United States Patent
Wu et al.

(10) Patent No.: US 10,734,652 B2
(45) Date of Patent: Aug. 4, 2020

(54) GRAPHENE DISPERSION, METHOD FOR PRODUCING ELECTRODE PASTE, AND METHOD FOR PRODUCING ELECTRODE

(71) Applicant: Toray Industries, Inc., Tokyo (JP)

(72) Inventors: Zhenqi Wu, Shanghai (CN); Zhijun Chen, Shanghai (CN); Peiyu Sun, Shanghai (CN); Eiichiro Tamaki, Otsu (JP); Manabu Kawasaki, Otsu (JP); Gangqiao Liu, Shanghai (CN)

(73) Assignee: TORAY INDUSTRIES, INC., Tokyo (JP)

( * ) Notice: Subject to any disclaimer, the term of this patent is extended or adjusted under 35 U.S.C. 154(b) by 12 days.

(21) Appl. No.: 16/077,623

(22) PCT Filed: Mar. 9, 2017

(86) PCT No.: PCT/CN2017/076090
§ 371 (c)(1),
(2) Date: Aug. 13, 2018

(87) PCT Pub. No.: WO2017/152853
PCT Pub. Date: Sep. 14, 2017

(65) Prior Publication Data
US 2019/0067700 A1 Feb. 28, 2019

(30) Foreign Application Priority Data
Mar. 9, 2016 (CN) .......................... 2016 1 0131701

(51) Int. Cl.
| | | |
|---|---|---|
| *H01B 1/24* | (2006.01) | |
| *H01B 1/04* | (2006.01) | |
| *B82Y 30/00* | (2011.01) | |
| *H01M 4/62* | (2006.01) | |
| *H01M 4/04* | (2006.01) | |
| *C01B 32/182* | (2017.01) | |
| *H01M 10/0525* | (2010.01) | |
| *H01M 10/052* | (2010.01) | |

(52) U.S. Cl.
CPC ............ *H01M 4/625* (2013.01); *B82Y 30/00* (2013.01); *C01B 32/182* (2017.08); *H01B 1/04* (2013.01); *H01B 1/24* (2013.01); *H01M 4/0404* (2013.01); *H01M 4/0471* (2013.01); *H01M 10/0525* (2013.01); *C01B 2204/22* (2013.01); *C01B 2204/28* (2013.01); *C01B 2204/32* (2013.01); *H01M 10/052* (2013.01)

(58) Field of Classification Search
CPC . H01B 1/04; H01B 1/24; B82Y 30/00; B82Y 40/00
USPC ......................... 252/500, 502, 510; 977/734
See application file for complete search history.

(56) References Cited

U.S. PATENT DOCUMENTS

| | | | |
|---|---|---|---|
| 9,327,985 B2 | 5/2016 | Fugetsu | |
| 2010/0105834 A1* | 4/2010 | Tour ...................... | B82Y 30/00 525/50 |

FOREIGN PATENT DOCUMENTS

| | | | | |
|---|---|---|---|---|
| CN | 103456922 A | | 12/2013 | |
| CN | 103887506 A | | 6/2014 | |
| CN | 104505513 A | | 4/2015 | |
| CN | 104959050 A | * | 10/2015 | ............. C01B 32/20 |
| CN | 105118998 A | | 12/2015 | |
| WO | 2011074125 A1 | | 6/2011 | |
| WO | WO-2014044210 A1 | * | 3/2014 | ........... C01B 32/182 |

OTHER PUBLICATIONS

International Search Report and Written Opinion for International Application No. PCT/CN2017/076090, dated Jun. 7, 2017—6 pages.

* cited by examiner

*Primary Examiner* — Tri V Nguyen
(74) *Attorney, Agent, or Firm* — RatnerPrestia

(57) ABSTRACT

The purpose of the present invention is to provide a graphene dispersion which has high dispersibility and which is capable of exhibiting high electrical conductivity and ionic conductivity when used as a raw material for producing an electrode material. The present invention provides a graphene dispersion including a graphene, an amine compound having a molecular weight of 150 or less, and an organic solvent, wherein the mass ratio of an amine compound to the graphene is 0.005 or more and 0.30 or less.

12 Claims, No Drawings

GRAPHENE DISPERSION, METHOD FOR PRODUCING ELECTRODE PASTE, AND METHOD FOR PRODUCING ELECTRODE

CROSS REFERENCE TO RELATED APPLICATIONS

This is the U.S. National Phase application of PCT/CN2017/076090, filed Mar. 9, 2017, which claims priority to Chinese Patent Application No. 201610131701.8, filed Mar. 9, 2016, the disclosures of each of these applications being incorporated herein by reference in their entireties for all purposes.

TECHNICAL FIELD OF THE INVENTION

The present invention relates to a graphene dispersion with a graphene dispersed in an organic solvent, a method for producing an electrode paste using the graphene dispersion, and a method for producing an electrode.

BACKGROUND OF THE INVENTION

A graphene is a two-dimensional crystal composed of carbon atoms. The graphene is a material that has attracted great attention since it was discovered in 2004. The graphene has excellent electrical, thermal, optical and mechanical properties, and is expected to be applied in a wide range of fields such as those of battery materials, energy storage materials, electronic devices and composite materials.

Examples of a method for producing a graphene include mechanical separation methods, CVD (chemical vapor deposition) methods and CEG (crystal epitaxial growth) methods. Among them, an oxidation-reduction method, i.e., a method in which graphite oxide is obtained by oxidizing natural graphite, and then subjected to a reduction reaction to produce a graphene is promising as an industrial production method because the method is capable of mass-producing the graphene.

For enlarging the application range of the graphene, it is useful to use the graphene in the form of a dispersion so that the graphene is kneaded with a resin, or mixed with an electrode paste for batteries. However, the graphene aggregates easily, and it is thus difficult to prepare a graphene dispersion with high-concentration.

Studies have been conducted on use of various kinds of dispersants for improving the dispersibility of the graphene. Patent Document 1 discloses a technique for dispersing a graphene using a surfactant as a dispersant. Patent Document 2 discloses improvement of dispersibility using a polycyclic aromatic compound.

PRIOR ART DOCUMENTS

Patent Documents

Patent Document 1: International Publication No. WO 2011-074125

Patent Document 2: Japanese Patent No. 2015-059079

SUMMARY OF THE INVENTION

A graphene dispersion is apt to have a very high viscosity, and is thus difficult to be added to a resin or a battery, and therefore the electrically conductive performance of the graphene dispersion cannot be sufficiently exhibited. Use of dispersants as described in Patent Documents 1 and 2 can improve the dispersibility of a graphene, but these dispersants do not have an effect of reducing the viscosity.

An object of the present invention is to provide a graphene dispersion having a high concentration and a low viscosity.

For achieving the above-mentioned object, the present invention provides a graphene dispersion including a graphene, an amine compound having a molecular weight of 150 or less, and an organic solvent, wherein the mass ratio of the amine compound to the graphene is 0.005 or more and 0.3 or less.

A graphene dispersion of the present invention has a reduced viscosity, and therefore can be easily mixed with a resin or an electrode paste. A graphene is favorably mixed with an active material in a lithium ion battery, or the like, and thus a high-power battery is obtained.

DETAILED DESCRIPTION OF CERTAIN EMBODIMENTS OF THE INVENTION

<Graphene>

A graphene is a sheet of $sp^2$ bonded carbon atoms with a thickness equal to that of one atom (monolayer graphene) in the narrow sense, but in this specification, the term "graphene" also includes one in the form of a flake in which monolayer graphene sheets are stacked. Similarly, the term "graphene oxide" also includes one in the form of a flake in which monolayer graphene oxide sheets are stacked. In this specification, the term "graphene oxide" refers to one in which an element ratio of oxygen atoms to carbon atoms (oxidation degree) as measured by X-ray photoelectron spectroscopic analysis (XPS) is more than 0.4, and the term "graphene" refers to one in which the above-mentioned element ratio is 0.4 or less. The graphene or graphene oxide may contain a surface treatment agent for the purpose of, for example, improving dispersibility as described later, and in this specification, the term "graphene oxide" or "graphene" also includes a graphene oxide or graphene which contains such a surface treatment agent.

Preferably, the graphene contained in the graphene dispersion of the present invention is at least partially functionalized. The functionalization means that a part of a graphite structure of carbon is modified with a hydroxyl group, a carboxyl group, a ketone group or an epoxy group.

For obtaining a functionalized graphene, it is preferred to prepare a graphene by a so-called oxidation-reduction method in which a graphene oxide is reduced.

A method for preparing a graphene oxide is not particularly limited, and a publicly known method such as a Hummers' method can be used. Further, a commercially available graphene oxide can also be used. The case where the Hummers' method is used as the method of preparing the graphene oxide will be described below.

Graphite and sodium nitrate are put in a concentrated sulfuric acid, and potassium permanganate was added gradually while stirring the resulting mixture so as to avoid causing temperature rise. The resulting mixture is stirred/reacted at a temperature of 25° C. to 50° C. for 0.2 to 5 hours. Thereafter the resulting mixture is diluted by adding ion-exchanged water to form a suspension, and the suspension is reacted at a temperature of 80° C. to 100° C. for 5 to 50 minutes. Finally, hydrogen peroxide and deionized water are added, and the resulting mixture is reacted for 1 to 30 minutes to obtain a graphene oxide dispersion. The obtained graphene oxide dispersion is filtered and washed to obtain a graphene oxide gel. The graphene oxide gel may be diluted, and subjected to a mixing treatment with a surface treatment agent, or a reduction treatment.

A graphite serving as a raw material of the graphene oxide may be either artificial graphite or natural graphite; however, natural graphite is preferably used. The mesh number of the graphite serving as a raw material is preferably 20000 or less, and more preferably 5000 or less.

As an example of the ratio of each reactant, 150 to 300 ml of concentrated sulfuric acid, 2 to 8 g of sodium nitrate, 10 to 40 g of potassium permanganate and 40 to 80 g of hydrogen peroxide are added relative to 10 g of graphite. When sodium nitrate and potassium permanganate are added, a temperature is controlled by use of an ice bath. A mass of deionized water at the time of adding hydrogen peroxide and deionized water is ten to twenty times larger than the mass of hydrogen peroxide. A mass content of the concentrated sulfuric acid to be used is preferably 70% or more, and more preferably 97% or more.

Although the graphene oxide has high dispersibility, itself is insulating and cannot be used for a conductive additive or the like. When the oxidation degree of the graphene oxide is excessively high, the electric conductivity of a graphene powder obtained by reduction may be deteriorated, and therefore a ratio of carbon atoms to oxygen atoms of the graphene oxide as measured by X-ray photoelectron spectroscopy is preferably 0.5 or more. In measurement of the graphene oxide by X-ray photoelectron spectroscopy, it is sufficiently dried.

If the graphite is not oxidized up to its inside, sheet-like graphene powder is hardly obtained after reduction of the graphene oxide. Accordingly, it is preferred that a graphite specific peak is not detected at the time of analyzing the dried graphene oxide by an X-ray diffraction analysis.

The oxidation degree of the graphene oxide can be adjusted by changing the amount of an oxidant to be used in oxidation reaction of graphite. Specifically, the oxidation degree increases as the ratio of the amount of sodium nitrate and potassium permanganate to be used in oxidation reaction to the amount of graphite becomes larger, and the oxidation degree decreases as the above-mentioned ratio becomes smaller. The mass ratio of sodium nitrate to graphite is not particularly limited, but it is preferably 0.200 or more and 0.800 or less, more preferably 0.250 or more and 0.500 or less, and still more preferably 0.275 or more and 0.425 or less. The ratio of potassium permanganate to graphite is not particularly limited, but it is preferably 1.00 or more, more preferably 1.40 or more, and still more preferably 1.65 or more. The ratio of potassium permanganate to graphite is preferably 4.00 or less, more preferably 3.00 or less, and still more preferably 2.55 or less.

In the reduction step, the graphene oxide dispersed in a dispersion medium containing water is reduced to a graphene.

The dispersion medium containing water may be water alone, or may also contain a solvent other than water. As the solvent other than water, a polar solvent is preferred, and preferred examples thereof include ethanol, methanol, 1-propanol, 2-propanol, N-methylpyrrolidone, dimethylformamide, dimethylacetamide, dimethylsulfoxide, γ-butyrolactone and mixtures thereof.

The method for reducing the graphene oxide is not particularly limited, but chemical reduction is preferred. In the case of chemical reduction, examples of a reducing agent include organic reducing agents and inorganic reducing agents, with inorganic reducing agents being more preferred from the viewpoint of ease of purification after reduction.

Examples of the organic reducing agent include aldehyde-based reducing agents, hydrazine derivative reducing agents and alcohol-based reducing agents, and among them, alcohol-based reducing agents are especially preferred because they are capable of relatively gently reducing the graphene oxide. Examples of the alcohol-based reducing agent include methanol, ethanol, propanol, isopropyl alcohol, butanol, benzyl alcohol, phenol, ethanolamine, ethylene glycol, propylene glycol and diethylene glycol.

Examples of the inorganic reducing agent include sodium dithionite, potassium dithionite, phosphonous acid, sodium borohydride and hydrazine, and among them, sodium dithionite and potassium dithionite are preferably used because they are able to reduce the graphene oxide while relatively retaining acidic groups, so that a graphene having high dispersibility in a solvent can be produced.

After completion of the reduction step, a purification step of diluting the graphene preferably with water and filtering the diluted graphene is carried out to obtain a gel-like graphene dispersion (preferably dispersion of water).

For forming an organic solvent dispersion from the gel-like graphene water dispersion obtained as described above, the gel-like water dispersion may be temporarily dried, and then stirred together with an organic solvent, or the gel-like water dispersion may be stirred together with an organic solvent, followed by removing water. The method for stirring the gel-like water dispersion together with an organic solvent is not particularly limited, but it is preferred to use a media-less type mixer. Examples of the media-less type mixer include FILMIX (registered trademark) Model 30-30 (manufactured by PRIMIX Corporation), CLEAMIX (registered trademark) CLM-0.8S (manufactured by M Technique Co., Ltd.), SUPER SHEAR MIXER SDRT 0.35-0.75 (manufactured by SATAKE CHEMICAL EQUIPMENT. MFG, LTD.) and HOMO DISPER.

The median diameter of the graphene contained in the graphene dispersion of the present invention is preferably 1 μm or more and 15 μm or less. Here, the median diameter of the graphene is a median diameter measured by a laser diffraction/scattering particle size distribution measuring apparatus, and specifically, the median diameter of the graphene can be measured by a method as described in Measurement Example 2. The lower limit of the median diameter of the graphene is preferably 1 μm or more, more preferably 2 μm or more, and still more preferably 3 μm or more, and the upper limit of the median diameter of the graphene is preferably 15 μm or less, more preferably 10 μm or less, and still more preferably 5 μm or less. When the median diameter is less than 1 μm, the number of contact points between graphene sheets becomes larger, so that the electric resistance value tends to easily increase in application of the graphene to an electrode. When the median diameter is more than 15 μm, the graphene has a low separation degree and low dispersibility in a solvent, so that coatability as an electrode paste and quality of a coating film surface may be deteriorated, thus making it difficult to form a favorable conductive path in formation of an electrode.

The element ratio of oxygen to carbon (O/C ratio) as measured by X-ray photoelectron spectroscopy (XPS) in the graphene existing in the graphene dispersion of the present invention is preferably 0.06 or more and 0.30 or less. In XPS, a measurement is made using a sample obtained by sufficiently purifying the graphene dispersion by repeating dilution with water and filtration to remove dispersants other than the graphene, and then performing preliminary drying by a vacuum drying machine or a lyophilization machine. The dried sample is introduced into a measurement room with a high-vacuum chamber, a surface of the sample placed in ultra-high vacuum is irradiated with a soft X-ray, and photoelectrons released from the surface are detected using a detector. The photoelectrons are measured by wide scanning and narrow scanning, and the binding energy value of bound electrons in the substance is determined to obtain element information of the substance surface.

When the graphene dispersion of the present invention is measured by XPS, a C1s peak derived from carbon is detected near 284 eV, and it is known that the peak is shifted to the high energy side when carbon is bonded to oxygen. Specifically, a peak based on a C—C bond, C=C double bond or C—H bond in which carbon is not bonded to oxygen is not shifted, and is detected near 284 eV, and the peak is shifted to near 286.5 eV in the case of a C—O single bond, to near 287.5 eV in the case of a C=O double bond, and to near 288.5 eV in the case of a COO bond. Accordingly, signals derived from carbon are detected in the form of overlapped peaks near 284 eV, near 286.5 eV, near 287.5 eV and near 288.5 eV. At the same time, a N1s peak derived from nitrogen is detected near 402 eV, and an O1s peak derived from oxygen is detected near 533 eV. Further, the O/C ratio can be determined from the ratio of a peak area at an O1s peak to a peak area at a C1s peak.

Oxygen atoms on the graphene surface are oxygen atoms included in acidic groups bonded to the graphene itself, and in acidic groups of a surface treatment agent adhere on the graphene surface. These acidic groups improve the dispersion state of the graphene, and form contact points at which combined water is bonded to the graphene. When the number of acidic groups on the graphene surface is excessively small, dispersibility is deteriorated, and when the number of acidic groups on the graphene surface is excessively large, electric conductivity is reduced, leading to deterioration as a conductive additive. The O/C ratio of the graphene is more preferably 0.07 or more, still more preferably 0.09 or more, and especially preferably 0.10 or more. The O/C ratio of the graphene is more preferably 0.25 or less, still more preferably 0.20 or less, and especially preferably 0.15 or less.

The O/C ratio of the graphene can be controlled by changing the oxidation degree of a graphene oxide serving as a raw material, or changing the amount of a surface treatment agent. When the oxidation degree of the graphene oxide is high, the amount of oxygen atoms remaining after reduction increases, and when the oxidation degree is low, the amount of oxygen atoms remaining after reduction decreases. The amount of oxygen atoms can be increased by increasing the deposited amount of a surface treatment agent having acidic groups.

The element ratio of nitrogen to carbon (N/C ratio) as measured by X-ray photoelectron spectroscopy in the graphene existing in the dispersion is preferably 0.005 or more and 0.030 or less, and still more preferably 0.010 or more and 0.025 or less. The nitrogen atoms on the graphene surface originate from nitrogen-containing functional groups such as an amino group and a nitro group and nitrogen-containing heterocyclic rings such as a pyridine group and an imidazole group, which are contained in the surface treatment agent. Preferably, these nitrogen-containing groups are contained in a moderate amount for improving the dispersibility of the graphene. When the N/C ratio in the graphene is more than 0.030, electric conductivity is easily reduced because nitrogen atoms replace a graphene conjugated structure. Preferably, the surface treatment agent containing a nitrogen element exists in a small amount for contributing to graphene dispersibility. The N/C ratio can be determined from the peak area of the C1s peak and the N1s peak in a similar way as in the case of the O/C ratio.

The specific surface area of the graphene contained in the graphene dispersion of the present invention, which is measured by a BET measurement method, is preferably 80 $m^2/g$ or more and 250 $m^2/g$ or less (hereinafter, this specific surface area is sometimes referred to simply as a "specific surface area"). The specific surface area of the graphene reflects the thickness of the graphene and the separation degree of the graphene, and a larger specific surface area indicates that the graphene is thinner, and has a higher separation degree. When the specific surface area of the graphene is less than 80 $m^2/g$, it tends to be difficult to form an electrically conductive network, and when the specific surface area of the graphene is more than 250 $m^2/g$, dispersibility tends to be reduced. The specific surface area of the graphene is more preferably 100 $m^2$ or more, and still more preferably 130 $m^2/g$ or more. The specific surface area of the graphene is preferably 200 $m^2$ or less, and more preferably 180 $m^2/g$ or less. In the BET measurement method, a sample obtained by sufficiently purifying the graphene dispersion by repeating dilution with water and filtration to remove dispersants other than the graphene, and then performing preliminary drying by a vacuum drying machine or a lyophilization machine is measured in accordance with a method as described in JIS Z8830:2013. A carrier gas method is used for measurement of the amount of an adsorbed gas, and a one-point method is used for analysis of adsorption data.

The graphene contained in the graphene dispersion of the present invention is preferably a graphene on which a surface treatment agent having an acidic group (hereinafter, sometimes referred to simply as a "surface treatment agent") is present. The surface treatment agent having an acidic group at least partially adheres on the surface of the graphene, and thus exhibits an effect of improving the dispersibility of the graphene. Here, the acidic group is a hydroxy group, a phenolic hydroxy group, a nitro group, a carboxyl group or a carbonyl group. The surface treatment agent is not particularly limited as long as it is a compound having an acidic group, i.e., a hydroxy group, a phenolic hydroxy group, a nitro group, a carboxyl group or a carbonyl group, and the surface treatment agent may be a high-molecular-weight compound or a low-molecular-weight compound.

Examples of the high-molecular-weight compound having an acidic group may include polyvinyl pyrrolidone, polyvinyl alcohol and polymethyl vinyl ether. The low-molecular-weight compound is preferably a compound having an aromatic ring from the viewpoint of affinity with the graphene surface.

For improving the electric conductivity of the graphene, a low-molecular-weight compound is more preferred than a high-molecular-weight compound. Particularly, a high-molecular-weight compound may hinder the electric conductivity of the graphene, and therefore the total content of high-molecular-weight compounds including other additives or the like existing in the graphene dispersion is preferably 0.5% by mass or less, more preferably 0.3% by mass or less, and especially preferably 0.1% by mass or less based on the total amount of the graphene dispersion. Here, the high-molecular-weight compound is a compound having a mass average molecular weight of 3000 or more.

Among low-molecular-weight compounds, compounds having a catechol group are preferred as the surface treatment agent because they have adhesion with the graphene, and dispersibility in a solvent. Examples of the compound having a catechol group include catechol, dopamine hydrochloride, 3-(3,4-dihydroxyphenyl)-L-alanine, 4-(1-hydroxy- 2-aminoethyl)cathecol, 3,4-dihydroxybenzoic acid, 3,4-dihydroxyphenylacetic acid, caffeine acid, 4-methylcatechol and 4-tert-butylpyrocatechol.

The acidic group of the surface treatment agent is preferably a phenolic hydroxy group. Examples of the compound having a phenolic hydroxy group include phenol, nitrophenol, cresol, catechol and compounds having a structure in which the any of the above-mentioned compounds is partially substituted.

The surface treatment agent may have a basic group in addition to an acidic group, and particularly when the surface treatment agent has an amino group, dispersibility is improved. Accordingly, a compound having both a catechol group and an amino group is especially preferred as the surface treatment agent. Examples of the above-mentioned compound include dopamine hydrochloride <Amine Compound>

The graphene dispersion of the present invention contains an amine compound having a molecular weight of 150 or less.

The reason why the graphene dispersion has a viscosity higher than that of a normal carbon dispersion is that the graphene has a high specific surface area, and the graphene contains functional groups. The functional group contained in the graphene produces an interaction between graphene sheets, so that a network connecting graphene is formed, leading to an increase in viscosity. The amine compound can interact with the functional group on the graphene surface to suppress the interaction between graphene sheets. When the amine compound has a large molecule, its removal in the dispersion is difficult, and the number of amine functional groups per mass decreases. Therefore, in the present invention, an amine compound having a molecular weight of 150 or less is used. The molecular weight of the amine compound is preferably 100 or less.

Specific examples of the amine compound having a molecular weight of 150 or less include methylamine, ethylamine, propylamine, butylamine, amylamine, hexylamine, heptylamine, octylamine, methanolamine, ethanolamine, diethanolamine, triethanolamine, propanolamine, isopropanolamine, 2-amino-2-methyl-1-propanol, butanolamine, isobutanolamine, diglycolamine, benzenamine, benzylamine, ethylenediamine, 1,3-propyldiamine, o-phenylenediamine, p-phenylenediamine, tetramethylethylenediamine, triethylenetetramine, cyclobutylamine, cycloamylamine, cyclohexylamine, diethylamine, triethylamine and tert-butylamine, and two or more of these amine compounds may be used.

Further, among the amine compounds, primary amine compounds are preferred. Particularly the amine functional group in the amine compound interacts with the functional group in the graphene to reduce the viscosity. The amine compound easily interacts when steric hinderance near the nitrogen element is reduced, and therefore primary amine compounds are more preferred than secondary amine compounds and tertiary amine compounds. Specifically, it is preferred to use methylamine, ethylamine, propylamine, butylamine, amylamine, methanolamine, ethanolamine, propanolamine, isopropanolamine, 2-amino-2-methyl-1-propanol, butanolamine, isobutanolamine, diglycolamine, benzenamine, ethylenediamine, 1,3-propyldiamine, cyclobutylamine, cycloamylamine, cyclohexylamine or tert-butylamine.

The amine compound is especially preferably a compound having an alcoholic hydroxyl group. When the amine compound has an alcoholic hydroxyl group, the adsorptivity of the amine compound to the graphene is enhanced, so that the interaction between the amine and the graphene functional group is facilitated. Specific examples of the amine compound include ethanolamine, propanolamine, isopropanolamine, 2-amino-2-methyl-1-propanol, butanolamine, isobutanolamine and diglycolamine.

When the mass ratio of the amine compound to the graphene is excessively small, a viscosity reducing effect is hardly exhibited, and when the mass ratio of the amine compound to the graphene is excessively large, battery performance is deteriorated when the graphene is added to a lithium ion battery or the like. Therefore, in the present invention, the addition amount of the amine compound is 0.005 or more and 0.30 or less in terms of a mass ratio to the graphene. The mass ratio of the amine compound to the graphene is preferably 0.01 or more and 0.20 or less, more preferably 0.02 or more and 0.15 or less, and especially preferably 0.05 or more and 0.10 or less.

<Organic Solvent>

Preferably, the organic solvent in the graphene dispersion of the present invention contains N-methylpyrrolidone.

N-methylpyrrolidone is preferably used because it is a solvent which has high affinity with the amine compound to be added in the present invention and in which the graphene is easily dispersed. Preferably, the organic solvent in the graphene dispersion contains 50% or more of N-methylpyrrolidone.

The solvent contained in the graphene dispersion is preferably an organic solvent having a dipole moment of 3.0 Debye or more. Examples of the above-mentioned solvent include N-methylpyrrolidone, γ-butyrolactone, dimethylacetamide, dimethylformamide, dimethylsulfoxide and acetonitrile. Since a solvent having high volatility is difficult to stably handle, a solvent having a high boiling point is preferred. The boiling point of the solvent is preferably 150° C. or higher, and more preferably 180° C. or higher.

<Graphene Dispersion>

The solid content of the graphene dispersion of the present invention is preferably 1.5% by mass or more and 5% by mass or less. When the solid content is 5% by mass or less, fluidity is easily exhibited, leading to excellent handling characteristics. When the solid content is less than 1.5% by mass, coatability tends to be deteriorated in use of the graphene dispersion in production of an electrode paste because the solid content of the electrode paste is reduced by the solvent in the dispersion, leading to a reduction in viscosity. The solid content of the graphene dispersion can be calculated by drying the solvent from the graphene dispersion, then measuring the mass of the residues, and dividing the measured value by the mass of the graphene dispersion itself. Specifically, about 1 g of the graphene dispersion is deposited on a glass substrate having a known mass, heated for 1.5 hours on a hot plate at a controlled temperature of 120° C. to volatilize the solvent, the mass of the graphene remaining thereafter is measured, and the solid content of the graphene dispersion is calculated.

By adding the amine compound, the viscosity of the graphene dispersion of the present invention can be reduced while favorable dispersion of the graphene itself is maintained. When the favorable dispersion state of the graphene is not maintained, and the graphene is aggregated, the viscosity is markedly reduced. There is a viscosity range preferred for ensuring that the graphene forms a favorable dispersion, and the dispersion has a viscosity which allows the dispersion to be handled. The viscosity of the graphene dispersion of the present invention under the condition of a temperature of 23° C. and a shear velocity of 1 $s^{-1}$ as a dispersion, the solid content of which is adjusted to 3% by mass with the organic solvent used, is preferably 20000 cP or less, and more preferably 10000 cP or less. The viscosity of the graphene dispersion of the present invention under the above-mentioned condition is preferably 1000 cP or more, more preferably 2000 cP or more, still more preferably 4000 cP or more, and further preferably 6000 cP or more.

The viscosity of the graphene dispersion of the present invention under the condition of a temperature of 23° C. and a shear velocity of 1 s$^{-1}$ as a dispersion, the solid content of which is adjusted to 2% by mass with the organic solvent used, is preferably 30 cP or less.

The solid content in measurement of the viscosity is adjusted in the following manner. Firstly, the solid content is measured by the above-mentioned method. When the measured solid content is higher than the specified solid content in measurement of the viscosity of the graphene dispersion, the same solvent as in the graphene dispersion is added, and the mixture is stirred by a mixer (AR-310 from THINKY CORPORATION.) to adjust the solid content to 2% by mass or 3% by mass. When the solid content is lower than the specified solid content in measurement of the viscosity, the graphene dispersion is concentrated by filtration to a solid content of 3% or more, the same solvent as in the graphene dispersion is then added, and the mixture is stirred by a mixer (AR-310 from THINKY CORPORATION.) to adjust the solid content to 2% by mass or 3% by mass.

The graphene dispersion may contain an additive in addition to the amine compound, but when the addition amount of a high-molecular-weight compound is large, electric conductivity between graphene sheets may be hindered, and therefore the total content of high-molecular-weight compounds including a surface treatment agent existing in the graphene dispersion is preferably 0.5% by mass or less, more preferably 0.3% by mass or less, and especially preferably 0.1% by mass or less based on the total amount of the graphene dispersion.

<Method for Producing Electrode Paste and Electrode>

The graphene dispersion of the present invention can also be used in production of an electrode paste to be used in production of an electrode for lithium ion batteries, etc. Specifically, an electrode paste can be prepared by mixing the graphene dispersion of the present invention as a conductive additive, an electrode active material, a binder, and an appropriate amount of a solvent as necessary.

The electrode active material to be applied in production of an electrode paste is not particularly limited, and examples of the electrode active material as a positive active material include composite oxides of lithium and transition metal such as lithium cobaltate ($LiCoO_2$), lithium nickelate ($LiNiO_2$), spinel type lithium manganate ($LiMn_2O_4$), a ternary system in which a part of cobalt is replaced with nickel and manganese ($LiMn_xNi_yCo_{1-x-y}O_2$) and spinel type lithium manganate ($LiMn_2O_4$); olivine-based (phosphoric acid-based) active materials such as lithium iron phosphate ($LiFePO_4$); metal oxides such as $V_2O_5$; and metal compounds such as $TiS_2$, $MoS_2$ and $NbSe_2$. The electrode active material as a negative active material is not particularly limited, and examples thereof include carbon-based materials such as a natural graphite, an artificial graphite and a hard carbon; silicon compounds, in which SiO, SiC, or SiOC is a fundamental constituent element; lithium titanate ($Li_4Ti_5O_{12}$); metal oxides which is capable of a conversion reaction with lithium, such as manganese oxide (MnO) and cobalt oxide (CoO).

The binder is not particularly limited, and examples thereof include fluorine-based polymers such as polyvinylidene fluoride (PVDF) and polytetrafluoroethylene (PTFE); rubbers such as styrene-butadiene rubber (SBR) and natural rubber; polysaccharides such as carboxymethyl cellulose; and polyimide precursors and/or polyimide resins, polyamideimide resins, polyamide resins, polyacrylic acid, sodium polyacrylate, acrylic resins and polyacrylonitrile. They may be used as a mixture of two or more thereof.

The conductive additive contained in the electrode paste may be composed of only the graphene contained in the graphene dispersion of the present invention, or an additional conductive additive may be further added to the graphene. The additional conductive additive is not particularly limited, and examples thereof include carbon black types such as furnace black, Ketjen Black (registered trademark) and acetylene black; graphite such as natural graphite (flaky graphite, etc.) and artificial graphite; electrically conductive fibers such as carbon fiber and metal fiber; and powder of metals such as copper, nickel, aluminum and silver.

Examples of the solvent to be additionally used include NMP, γ-butyrolactone, water and dimethylacetamide, and it is most preferred to use NMP that is a solvent contained in the graphene dispersion of the present invention.

The electrode paste obtained in the manner described above is coated on current collector such as an aluminum foil, and dried to obtain an electrode.

EXAMPLES

<Measurement of Properties>

Measurement Example 1: BET Specific Surface Area

A specific surface area of a graphene was determined in the following manner: a sample was subjected to a dehydration treatment at 100 degrees for 3 hours using a pretreatment machine: Model Vac. II manufactured by BEL Japan, Inc., and then measured using nitrogen absorption/desorption equipment: Model BELSORP-mini II manufactured by BEL, Inc., and calculation was performed by a BET method.

Measurement Example 2: Particle Size Distribution of Graphene

A dispersant OP-20 (condensation product of alkylphenol and epoxyethane) was added to a graphene dispersion in such a manner that the concentration was 0.1% by mass, the mixture was sufficiently stirred, and treated for 10 minutes using an ultrasonic cleaning machine (SK-1200H manufactured by Shanghai Kudos Ultrasonic Instrument CORPORATION), and a median diameter, a volume mean diameter, an arithmetic mean diameter and a full width at half maximum (FWHM) were measured using a laser particle size analyzer (Microtrac, S3500).

Measurement Example 3: Element Ratio (XPS)

Measurement was performed using Quantera SXM (manufactured by PHI, Inc.). An excited X-ray is monochromatic Al Kα1 and Kα2 lines (1486.6 eV), a diameter of X-ray is 200 μm, and a photoelectron escape angle was set to 45°. A C1s main peak based on a carbon atom was set to 284.3 eV, an O1s peak based on an oxygen atom was attributed to a peak near 533 eV, and an O/C ratio was determined from the area ratio of the peaks.

Measurement Example 4: Viscosity

The graphene dispersion was adjusted so as to have a predetermined concentration. The solid content was first measured by the above-mentioned method. When the measured solid content is higher than the solid content in measurement of the viscosity of the graphene dispersion, NMP is added to graphene dispersion, and then subjected to a stirring treatment at 2000 rpm for 1 minute using a mixer (AR-310 from THINKY CORPORATION). When the solid content was lower than the solid content in measurement of the viscosity, the graphene dispersion is concentrated by filtration to the solid content in measurement or more, and then, NMP is added in the graphene dispersion, and the mixture is stirred by a mixer (AR-310 from THINKY CORPORATION.) to adjust. After the solid content was adjusted, a viscosity was measured using a viscometer: Model DV2T-LV from Brookfield Inc. The spindle was No. 34, data was taken every 10 seconds after 1 minute, and the average value for 1 minute was defined as a viscosity value. In the measurement, the shear rate was $1\ S^{-1}$, and the temperature was 23° C. The allowable error of the temperature in the measurement is ±1° C. The upper limit of the viscosity that can be measured under this measurement condition is 17700 cp.

<Preparation of Graphene Oxide Dispersion>

Graphite (THD-150 manufactured by Qingdao Tianheda Graphite Co., Ltd.), 98% by mass concentrated sulfuric acid and sodium nitrate were mixed, the mixture was cooled to 5° C., potassium permanganate was added thereto, and the mixture was held at 20° C. for 1.5 hours, heated to 35° C., and held for 2.5 hours. Thereafter, the mixture was heated to 98° C. while water was added thereto, and the mixture was held for 15 minutes. Thereafter, the mixture was cooled to room temperature, 30% by mass hydrogen peroxide was added thereto, acids and inorganic salts in the mixture were removed to obtain a graphene oxide dispersion.

The mass ratio of graphite, 98% by mass concentrated sulfuric acid, sodium nitrate, potassium manganate, water and 30% by mass hydrogen peroxide is 1:15:0.5:3:45:1.5. Results of X-ray diffraction measurement showed that there was an absorption peak at 11.6°, and the full width at half maximum (FWHM) was 0.9°.

<Preparation of Graphene/Water Dispersion Gel and Graphene Powder>

Preparation Example 1

The graphene oxide dispersion prepared in the manner described above was adjusted so as to have a concentration of 1% by mass, and treated for 0.5 hours by a ball mill: Model QM-3SP04. As treatment conditions, four 100 ml zirconia containers were provided, 100 zirconia balls of Φ6 mm and 16 zirconia balls of Φ10 mm were provided for each of the containers, the amount of a sample was set so that the total volume of the zirconia balls and the sample constituted ¾ of the volume of the zirconia container, and the rotation speed was 400 rpm. To the obtained graphene oxide dispersion sodium dithionite was added at 40° C. in a mass ratio of 3 to the graphene oxide, to reduce the graphene oxide with stirring for 0.5 hours by a hot plate stirrer. After the reduction, the mixture was repeatedly purified with water to obtain a 1% graphene/water dispersion gel.

The graphene/water dispersion gel was lyophilized to obtain a graphene powder, and the properties of the obtained graphene powder were measured in accordance with Measurement Example 1, Measurement Example 2 and Measurement Example 3. The results showed that the specific surface area was 102.7 $m^2/g$, the median diameter was 14.3 μm, the volume mean diameter was 20.1 μm, the arithmetic mean diameter was 5.0 μm, the FWHM was 9.9 μm, and the O/C ratio was 0.09.

Preparation Example 2

Except that the ball mill treatment time was 1 hour, the same procedure as in Preparation Example 1 was carried out to obtain a 1% graphene/water dispersion gel and then a graphene powder. The properties of the graphene powder were measured in accordance with Measurement Example 1, Measurement Example 2 and Measurement Example 3. The results showed that the specific surface area was 161.5 $m^2/g$, the median diameter was 12.7 μm, the volume mean diameter was 17.1 μm, the arithmetic mean diameter was 4.1 μm, the FWHM was 8.2 μm, and the O/C ratio was 0.11.

Preparation Example 3

Except that the ball mill treatment time was 2 hours, the same procedure as in Preparation Example 1 was carried out to obtain a 1% graphene/water dispersion gel and then a graphene powder. The properties of the graphene powder were measured in accordance with Measurement Example 1, Measurement Example 2 and Measurement Example 3. The results showed that the specific surface area was 227.8 $m^2/g$, the median diameter was 7.1 μm, the volume mean diameter was 10.2 μm, the arithmetic mean diameter was 2.3 μm, the FWHM was 5.3 μm, and the O/C ratio was 0.13.

Preparation Example 4

The graphene oxide dispersion prepared in the manner described above was adjusted so as to have a concentration of 1% by mass, and treated for 0.5 hours by an ultrasonic cell crushing machine: Model XC-CDH. As treatment conditions, the treatment amount was 400 ml, and the power was 300 W. Thereafter, the graphene oxide dispersion was reduced in the same manner as in Preparation Example 1 to obtain a 1% graphene/water dispersion gel.

The graphene/water dispersion gel was lyophilized to obtain a graphene powder, and the properties of the obtained graphene powder were measured in accordance with Measurement Example 1, Measurement Example 2 and Measurement Example 3. The results showed that the specific surface area was 284.3 $m^2/g$, the median diameter was 4.3 μm, the volume mean diameter was 6.4 μm, the arithmetic mean diameter was 1.4 μm, the FWHM was 2.7 μm, and the O/C ratio was 0.15.

Preparation Example 5

Except that the ultrasonic cell crushing machine treatment time was 1 hour, the same procedure as in Preparation Example 4 was carried out to obtain a 1% graphene/water dispersion gel and then a graphene powder. The properties of the graphene powder were measured in accordance with Measurement Example 1, Measurement Example 2 and Measurement Example 3. The results showed that the specific surface area was 311.4 $m^2/g$, the median diameter was 2.4 μm, the volume mean diameter was 3.7 μm, the arithmetic mean diameter was 0.9 μm, the FWHM was 1.9 μm, and the O/C ratio was 0.17.

Examples 1 to 14 and Comparative Examples 1 to 7

To 100 g of the 1% graphene/water dispersion gels obtained in the preparation examples, N-methylpyrrolidone (NMP) in an amount of 65.6 g, 49 g, 32.3 g, 24 g and 19 g was added, and the mixture was mixed under the condition of a mixing mode of 2000 rpm and 5 minutes using a mixer (AR-310 from THINKY CORPORATION.) Thereafter, water was removed by distillation to obtain dispersions having 1.5% by mass, 2% by mass, 3% by mass, 4% by mass and 5% by mass of graphene/NMP, respectively. An amine compound was added in the dispersion so as to attain a mass ratio to the graphene as described in Table 1 (the amine compound was not added for Comparative Examples 1 to 5), and the mixture was mixed under the condition of a mixing mode of 2000 rpm and 5 minutes by a mixer (AR-310 manufactured by THINKY CORPORATION.) to obtain a dispersion of graphene/NMP/amine compound.

Viscosity values measured in accordance with Measurement Example 4 in examples were collectively shown in Table 1. The symbol "H" in Table 1 indicates that the viscosity exceeded 17700 cp, i.e., a measuring limit.

TABLE 1

| | Amine compound | | Graphene/water dispersion gel | | |
|---|---|---|---|---|---|
| | Kind of amine compound | Mass ratio to graphene | Preparation Examples | Concentration (% by mass) | Viscosity (cp) |
| Example 1 | Ethanolamine (Molecular weight: 61) | 0.01 | Preparation Example 1 | 1.5<br>2<br>3<br>4<br>5 | 3.8<br>6.4<br>16781<br>H<br>H |
| Example 2 | Isobutanolamine (Molecular weight: 89) | 0.01 | Preparation Example 2 | 1.5<br>2<br>3<br>4<br>5 | 4<br>7.8<br>13216<br>H<br>H |
| Example 3 | Propanolamine (Molecular weight: 75) | 0.05 | Preparation Example 3 | 1.5<br>2<br>3<br>4<br>5 | 5.5<br>15.1<br>7081<br>16702<br>H |
| Example 4 | Isobutanolamine | 0.05 | Preparation Example 4 | 1.5<br>2<br>3<br>4<br>5 | 1.2<br>6.4<br>6685<br>14513<br>H |
| Example 5 | Ethanolamine | 0.1 | Preparation Example 5 | 1.5<br>2<br>3<br>4<br>5 | 5.1<br>10.1<br>6784<br>14944<br>H |
| Example 6 | Ethanolamine | 0.15 | Preparation Example 5 | 1.5<br>2<br>3<br>4<br>5 | 5.2<br>13.8<br>6228<br>13547<br>H |
| Example 7 | Propanolamine | 0.15 | Preparation Example 3 | 1.5<br>2<br>3<br>4<br>5 | 5.7<br>16.8<br>6064<br>12683<br>H |
| Example 8 | Isobutanolamine | 0.15 | Preparation Example 2 | 1.5<br>2<br>3<br>4<br>5 | 1.3<br>2.4<br>4795<br>11347<br>H |
| Example 9 | Ethanolamine | 0.2 | Preparation Example 1 | 1.5<br>2<br>3<br>4<br>5 | 2<br>8.4<br>5713<br>10021<br>17115 |
| Example 10 | Propanolamine | 0.2 | Preparation Example 4 | 1.5<br>2<br>3<br>4<br>5 | 4.6<br>12.8<br>5823<br>9678<br>17154 |
| Example 11 | Isopropanolamine | 0.1 | Preparation Example 2 | 1.5<br>2<br>3<br>4<br>5 | 4.1<br>11.9<br>6441<br>13844<br>H |

TABLE 1-continued

| | Amine compound | | Graphene/water dispersion gel | | |
|---|---|---|---|---|---|
| | Kind of amine compound | Mass ratio to graphene | Preparation Examples | Concentration (% by mass) | Viscosity (cp) |
| Example 12 | Diglycolamine (Molecular weight: 105) | 0.15 | Preparation Example 4 | 1.5<br>2<br>3<br>4<br>5 | 3.9<br>9.2<br>4988<br>12367<br>H |
| Example 13 | Octylamine (Molecular weight: 129) | 0.05 | Preparation Example 1 | 1.5<br>2<br>3<br>4<br>5 | 5.3<br>15<br>17667<br>H<br>H |
| Example 14 | Octylamine | 0.2 | Preparation Example 5 | 1.5<br>2<br>3<br>4<br>5 | 4.5<br>12.2<br>12276<br>H<br>H |
| Comparative Example 1 | — | — | Preparation Example 1 | 1.5<br>2<br>3<br>4<br>5 | 2012<br>5206<br>H<br>H<br>H |
| Comparative Example 2 | — | — | Preparation Example 2 | 1.5<br>2<br>3<br>4<br>5 | 2000<br>5277<br>H<br>H<br>H |
| Comparative Example 3 | — | — | Preparation Example 3 | 1.5<br>2<br>3<br>4<br>5 | 2043<br>5341<br>H<br>H<br>H |
| Comparative Example 4 | — | — | Preparation Example 4 | 1.5<br>2<br>3<br>4<br>5 | 2060<br>5407<br>H<br>H<br>H |
| Comparative Example 5 | — | — | Preparation Example 5 | 1.5<br>2<br>3<br>4<br>5 | 2071<br>5529<br>H<br>H<br>H |
| Comparative Example 6 | Oleylamine (Molecular weight: 267) | 0.05 | Preparation Example 1 | 1.5<br>2<br>3<br>4<br>5 | 2119<br>3128<br>H<br>H<br>H |
| Comparative Example 7 | Ethanolamine | 1 | Preparation Example 5 | 1.5<br>2<br>3<br>4<br>5 | 2.2<br>20.8<br>5340<br>10487<br>H |

Example 15 and Comparative Examples 8 and 9

Example 15

100 parts by mass of the 3% by mass graphene dispersion (solid content: 3 parts by mass) prepared in Example 1, 100 parts by mass of $LiMn_2O_4$ as an electrode active material and 5 parts by mass of polyvinyl fluoride as a binder were mixed by a planetary mixer to obtain an electrode paste. The electrode paste was applied to an aluminum foil (thickness: 18 μm) using a doctor blade (300 μm), dried at 80° C. for 15 minutes, and then vacuum-dried to prepare an electrode plate. Visual observation of the electrode plate showed that the electrode paste was flatly applied, and coarse particles etc. did not exist.

The prepared electrode plate was cut out into a piece of 15.9 mm in diameter as a positive electrode, and a lithium metal negative electrode was cut out into a piece of 16.1 mm in diameter as a counter electrode. Celgard #2400 (manufactured by Celgard, LLC) cut out into a size of 17 mm in diameter was used as a separator, and a solvent composed of ethylene carbonate and diethylene carbonate in proportions of 7:3 containing $LiPF_6$ with a concentration of 1M was used as an electrolyte to prepare a 2042 type coin battery. Three charge-discharge measurements were made at each of rates of 0.1 C, 1 C and 5 C in this order with an upper limit voltage of 4.3 V and a lower limit voltage of 3.0 V. In the third measurement, the discharge capacity at a rate of 0.1 C was 106 mAh/g, the discharge capacity at a rate of 1 C was 96 mAh/g, and the discharge capacity at a rate of 5 C was 46 mAh/g.

Comparative Example 8

Except that as the graphene dispersion, one in Comparative Example 1 was used, the same procedure as in Example 15 was carried out to obtain an electrode plate. Visual observation of the electrode plate showed that many coarse particles existed.

The prepared electrode plate was cut out into a piece of 15.9 mm in diameter as a positive electrode, and a lithium metal negative electrode was cut out into a piece of 16.1 mm in diameter as a counter electrode. Celgard #2400 (manufactured by Celgard, LLC) cut out into a size of 17 mm in diameter was used as a separator, and a solvent composed of ethylene carbonate and diethylene carbonate in proportions of 7:3 containing $LiPF_6$ with a concentration of 1M was used as an electrolyte to prepare a 2042 type coin battery. Three charge-discharge measurements were made at each of rates of 0.1 C, 1 C and 5 C in this order with an upper limit voltage of 4.3 V and a lower limit voltage of 3.0 V. In the third measurement, the discharge capacity at a rate of 0.1 C was 88 mAh/g, the discharge capacity at a rate of 1 C was 53 mAh/g, and the discharge capacity at a rate of 5 C was 0 mAh/g.

Comparative Example 9

Graphene dispersion used was same as that mentioned in Comparative Example 7, and other procedure same as Preparation Example 15 was carried out to obtain an electrode plate. Visual observation of the electrode plate showed that the electrode paste was flatly applied, and coarse particles etc. did not exist.

The prepared electrode plate was cut out into a piece of 15.9 mm in diameter as a positive electrode, and a lithium metal negative electrode was cut out into a piece of 16.1 mm in diameter as a counter electrode. Celgard #2400 (manufactured by Celgard, LLC) cut out into a size of 17 mm in diameter was used as a separator, and a solvent composed of ethylene carbonate and diethylene carbonate in proportions of 7:3 containing $LiPF_6$ with a concentration of 1M was used as an electrolyte to prepare a 2042 type coin battery. Three charge-discharge measurements were made at each of rates of 0.1 C, 1 C and 5 C in this order with an upper limit voltage of 4.3 V and a lower limit voltage of 3.0 V. In the third measurement, the discharge capacity at a rate of 0.1 C was 30 mAh/g, the discharge capacity at a rate of 1 C was 0 mAh/g, and the discharge capacity at a rate of 5 C was 0 mAh/g. It can be determined that large amount addition of ethanolamine in Comparative Example 7 hindered the electrochemical reaction.

The invention claimed is:

1. A graphene dispersion comprising a graphene, an amine compound having a molecular weight of 150 or less, and an organic solvent, wherein the mass ratio of the amine compound to the graphene is 0.02 or more and 0.15 or less, wherein the organic solvent is an organic solvent containing 50% by mass or more of N-methylpyrrolidone, wherein the amine compound is a compound having an alcoholic hydroxyl group, and wherein a solid content is 1.5% by mass or more and 5% by mass or less.

2. The graphene dispersion according to claim 1, wherein the amine compound is a primary amine compound.

3. The graphene dispersion according to claim 1, wherein the amine compound is isobutanolamine.

4. The graphene dispersion according to claim 1, wherein the element ratio of oxygen to carbon (O/C ratio) as measured by X-ray photoelectron spectroscopy in the graphene is 0.06 or more and 0.30 or less.

5. The graphene dispersion according to claim 1, wherein the element ratio of nitrogen to carbon (N/C ratio) as measured by X-ray photoelectron spectroscopy in the graphene is 0.005 or more and 0.030 or less.

6. The graphene dispersion according to claim 1, wherein the median diameter of the graphene is 1 μm or more and 15 μm or less.

7. The graphene dispersion according to claim 1, wherein the specific surface area of the graphene is 80 $m^2$/g or more and 250 $m^2$/g or less.

8. The graphene dispersion according to claim 1, wherein a viscosity of the graphene dispersion under the condition of a temperature of 23° C. and a shear velocity of 1 $s^{-1}$, as a dispersion, a solid content of which is adjusted to 2% by mass with the organic solvent, is 30 cp or less.

9. The graphene dispersion according to claim 1, wherein a viscosity of the graphene dispersion under the condition of a temperature of 23° C. and a shear velocity of 1 $s^{-1}$, as a dispersion, the solid content of which is adjusted to 3% by mass with the organic solvent, is 20000 cp or less.

10. The graphene dispersion according to claim 1, wherein a content of a compound having a mass average molecular weight of 3000 or more is 0.5% by mass or less.

11. A method for producing an electrode paste, comprising mixing the graphene dispersion according to claim 1, an electrode active material, a binder, and an appropriate amount of a solvent as necessary.

12. A method for producing an electrode, comprising applying to a current collector the electrode paste produced by the production method according to claim 11, and drying the electrode paste.

* * * * *